(12) United States Patent
Wakamatsu et al.

(10) Patent No.: US 12,229,157 B2
(45) Date of Patent: Feb. 18, 2025

(54) DATA COLLECTION FROM INDUSTRIAL EQUIPMENT

(71) Applicant: KABUSHIKI KAISHA YASKAWA DENKI, Kitakyushu (JP)

(72) Inventors: Tsuyoshi Wakamatsu, Fukuoka (JP); Mizuho Kimura, Fukuoka (JP); Mitsuaki Nakanishi, Fukuoka (JP)

( * ) Notice: Subject to any disclaimer, the term of this patent is extended or adjusted under 35 U.S.C. 154(b) by 76 days.

(21) Appl. No.: 18/306,246

(22) Filed: Apr. 25, 2023

(65) Prior Publication Data

US 2023/0259523 A1    Aug. 17, 2023

Related U.S. Application Data

(63) Continuation of application No. PCT/JP2020/040673, filed on Oct. 29, 2020.

(51) Int. Cl.
 *G06F 16/25*   (2019.01)
 *G06F 16/22*   (2019.01)
 *G06F 16/23*   (2019.01)

(52) U.S. Cl.
 CPC ........ *G06F 16/258* (2019.01); *G06F 16/2237* (2019.01); *G06F 16/2358* (2019.01)

(58) Field of Classification Search
 CPC . G06F 16/258; G06F 16/2237; G06F 16/2358
 See application file for complete search history.

(56) References Cited

U.S. PATENT DOCUMENTS

| 8,810,685 B2 * | 8/2014 | Kameyama | H04N 5/772 |
| | | | 348/118 |
| 2012/0200739 A1 * | 8/2012 | Kameyama | H04N 5/772 |
| | | | 348/E5.031 |

FOREIGN PATENT DOCUMENTS

| JP | 2013-225317 | 10/2013 |
| JP | 2018-055457 | 4/2018 |
| WO | 2017/216830 | 12/2017 |

OTHER PUBLICATIONS

International Search Report dated Dec. 28, 2020 for PCT/JP2020/040673.
International Preliminary Report on Patentability with Written Opinion dated May 11, 2023 for PCT/JP2020/040673.

* cited by examiner

*Primary Examiner* — Baoquoc N To
(74) *Attorney, Agent, or Firm* — SOEI PATENT & LAW FIRM

(57) ABSTRACT

A data collection device comprises circuitry configured to: store one or more collector programs, one or more analyzer programs, and a database accessor program; execute one or more programs selected from the one or more collector programs and the one or more analyzer programs to generate data having an array structure in which each record is identified by a position in a data arrangement; transfer data generated by execution of the selected one or more programs to the database accessor program as the registration data; and execute the database accessor program to convert the generated data from the array structure into a predetermined database format based on the data arrangement of the registration data and register the transferred data in a database.

20 Claims, 13 Drawing Sheets

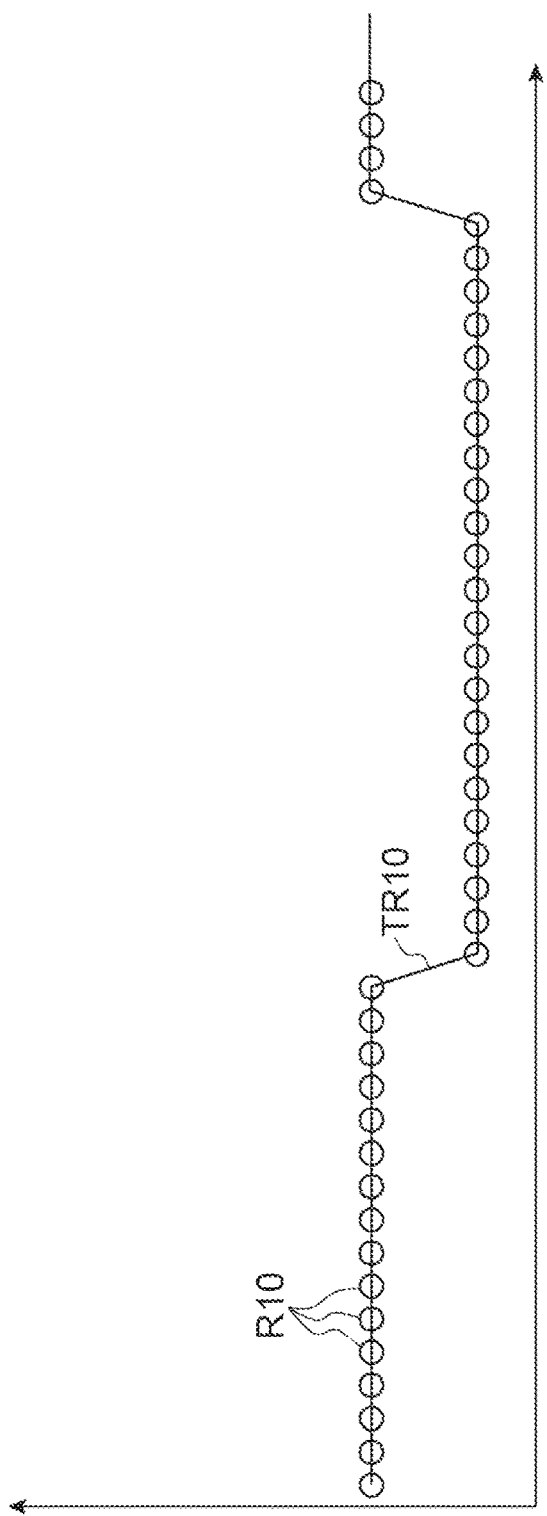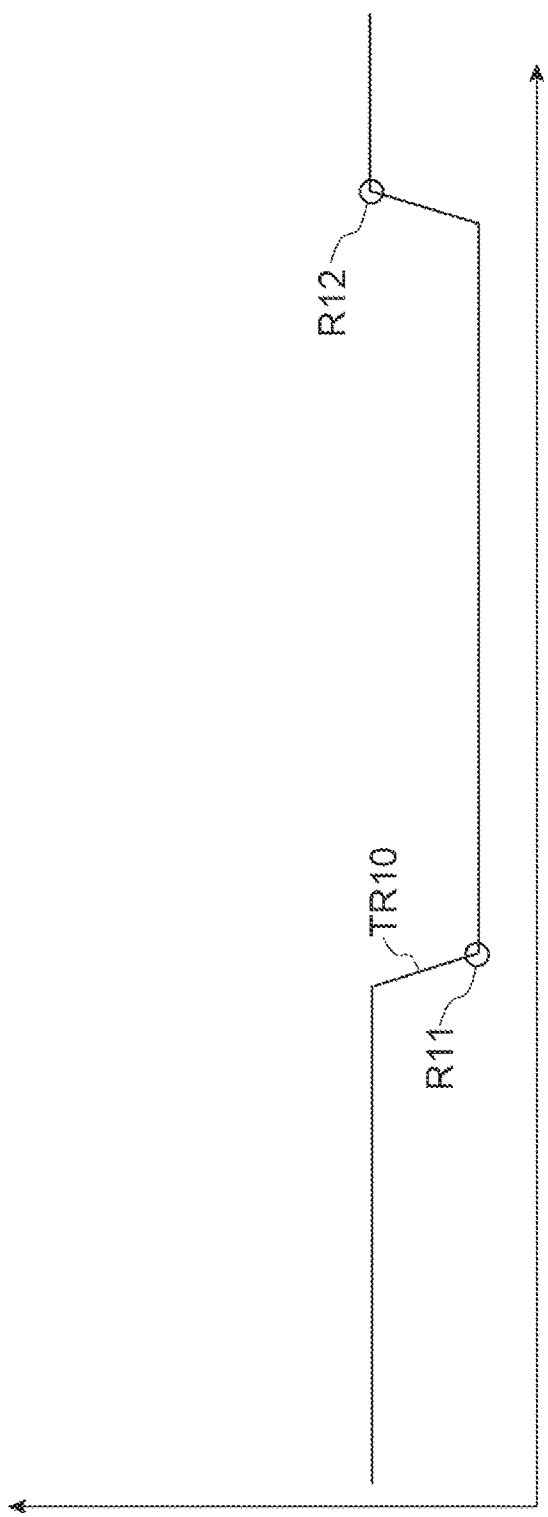

DATA COLLECTION FROM INDUSTRIAL EQUIPMENT

CROSS-REFERENCE TO RELATED APPLICATIONS

This application is a continuation application of PCT Application No. PCT/JP2020/040673, filed on Oct. 29, 2020. The entire contents of the above listed PCT and priority applications are incorporated herein by reference.

BACKGROUND

Field

The present disclosure relates to a data collection device and a data collection method.

Description of the Related Art

Japanese Unexamined Patent Application Publication No. 2013-225317 discloses a data collection device that collects data from each facility of a manufacturing line and adds the collected data to a database. The data collection device comprises: an acquisition means that acquires a file including the data and a file name from the facility; an extraction means that extracts additional information related to the data from the file name acquired by the acquisition means; and an addition means that adds the additional information extracted by the extraction means to the data in the file acquired by the acquisition means, and adds the data to the database.

SUMMARY

Disclosed herein is a data collection device. The data collection device may comprise circuitry configured to: store one or more collector programs each of which includes instructions of collecting, from industrial equipment, log data having an array structure in which each record is identified by a position in a data arrangement; store one or more analyzer programs each of which includes instructions of: acquiring analysis data having the array structure; extracting analysis records from the analysis data based on the data arrangement of the analysis data; and generating result data having the array structure based on the extracted analysis records; store a database accessor program which includes instructions of: acquiring registration data having the array structure; converting the registration data from the array structure into a predetermined database format based on the data arrangement of the registration data; and registering the converted registration data in a database; execute one or more programs selected from the one or more collector programs and the one or more analyzer programs; transfer data generated by execution of the selected one or more programs to the database accessor program as the registration data; and execute the database accessor program to register the transferred data in the database.

Additionally, a non-transitory memory device is disclosed herein. The non-transitory memory device has instructions stored thereon that, in response to execution by a processing device, cause the processing device to perform operations. The operations may comprise: collecting, from industrial equipment, log data having array structure in which each record is identified by a position in a data arrangement; extracting analysis records from the log data based on the data arrangement of the log data; generating result data having the array structure based on the extracted analysis records; converting the result data from the array structure into a predetermined database format based on the data arrangement of the result data; and registering the converted result data in a database.

Additionally, a data collection method is disclosed herein. The data collection method may comprise: collecting, from industrial equipment, log data having array structure in which each record is identified by a position in a data arrangement; extracting analysis records from the log data based on the data arrangement of the log data; generating result data having the array structure based on the extracted analysis records; converting the result data from the array structure into a predetermined database format based on the data arrangement of the result data; and registering the converted result data in a database.

BRIEF DESCRIPTION OF THE DRAWINGS

FIG. 5A, 5B is a graph for illustrating example primary analysis.

DETAILED DESCRIPTION

In the following description, with reference to the drawings, the same reference numbers are assigned to the same components or to similar components having the same function, and overlapping description is omitted.

Production System

Figure 1:
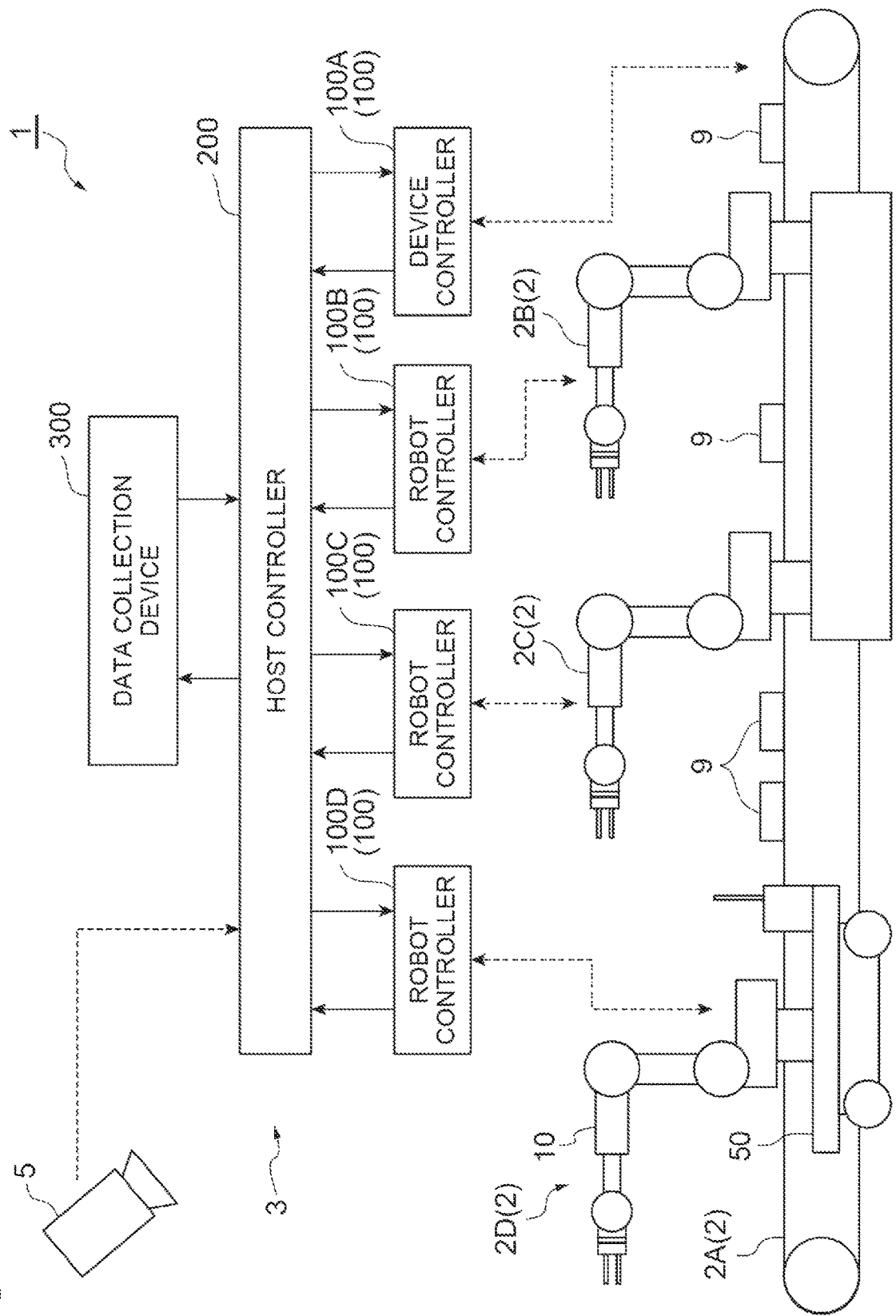
FIG. 1 is a schematic diagram illustrating an example configuration of a production system.

A production system 1 system illustrated in FIG. 1 is a system for producing workpiece. Hereinafter, in the process of producing workpiece, all objects to be worked are referred to as "workpiece". For example, the "workpiece" includes a final product in the production system 1, parts of the final product, and a unit in which a plurality of parts are combined.

The production system 1 includes one or more local devices 2 and a control system 3. For example, the production system 1 includes a plurality of local device 2 and performs workpiece production by cooperative operation of a plurality of the local device 2. The cooperative operation means that a plurality of local devices operate to share a plurality of processes for obtaining at least one final product. The plurality of local devices may operate to share a plurality of processes for obtaining one final product in a process unit, or may operate to share a plurality of processes for obtaining a plurality of final products in a final product unit.

Each of the plurality of the local device 2 is a device that performs work directly on a workpiece 9 at the workpiece 9 production site. The direct operation is an operation of applying some energy such as heat energy, kinetic energy, or potential energy to the workpiece 9.

Each of the plurality of the local device 2 is, for example, industrial equipment. The plurality of the local device 2 include at least a robot (at least one local device 2 is a robot). Also, the plurality of the local device 2 include industrial equipment that cooperates with the robot. Examples of the industrial equipment that cooperates with the robot include an NC machine tool in addition to other robots.

The plurality of the local device 2 illustrated in FIG. 1 includes, but is not limited to, a transport device 2A, robots 2B, 2C, and a mobile robot 2D. The number and type of the local device 2 can be modified as long as at least one robot is included.

The transport device 2A conveys the workpiece 9 using, for example, an electric motor or the like as a power source. Examples of the transport device 2A include a belt conveyor and a roller conveyor. The robots 2B, 2C and the mobile robot 2D perform work on the workpiece 9 carried by the transport device 2A. Examples of the work performed on the workpiece 9 include assembly of another workpiece 9 (for example, a sub-part) to the workpiece 9 (for example, a base part) conveyed by the transport device 2A, fastening (for example, bolt fastening) and joining (for example, welding) of parts in the workpiece 9 conveyed by the transport device 2A, loading of the workpiece 9 into an NC machining tool installed around the transport device 2A, and unloading of the workpiece 9 from the NC machining tool.

Figure 2:
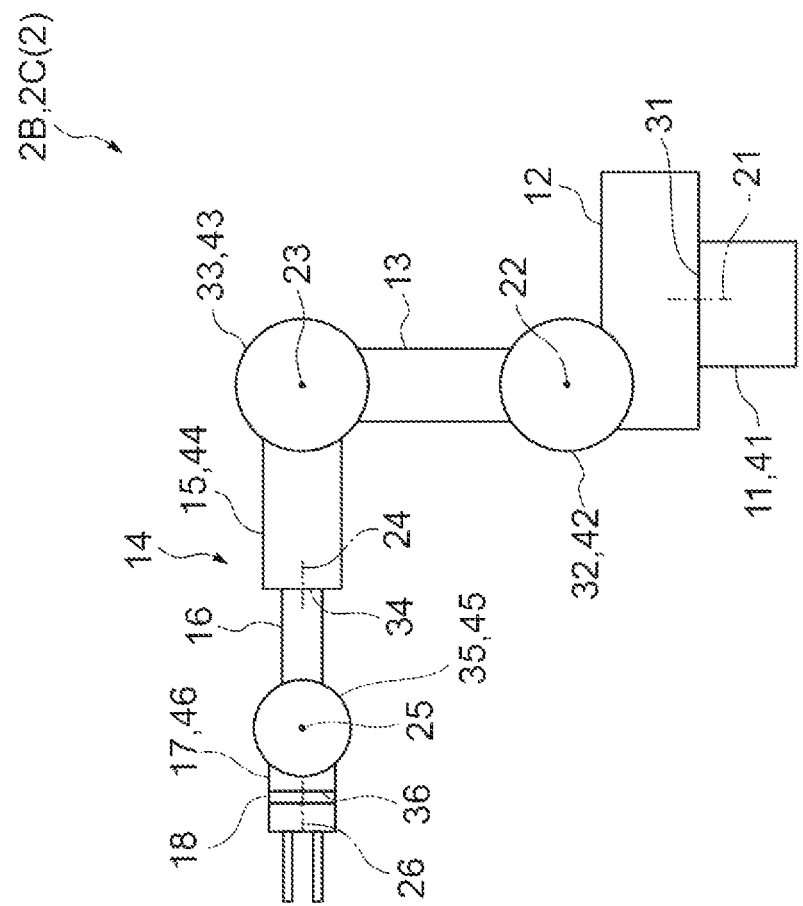
FIG. 2 is a schematic diagram illustrating an example configuration of the robot.

The robots 2B, 2C are six-axis vertical articulated robots, for example, and include a base 11, a pivoting portion 12, a first arm 13, a second arm 14, a third arm 17, a tip portion 18, and actuators 41, 42, 43, 44, 45, 46, as illustrated in FIG. 2. The base 11 is placed around the transport device 2A. The pivoting portion 12 is mounted on the base 11 to pivot about a vertical an axis 21.

The first arm 13 is connected to the pivoting portion 12 to swing about an axis 22 that intersects (e.g., is orthogonal to) the axis 21. The intersection includes a case where there is a twisted relationship such as so-called three-dimensional crossing. The second arm 14 is connected to the tip portion of the first arm 13 to swing about an axis 23 substantially parallel to the axis 22. The second arm 14 includes an arm base 15 and an arm end 16. The arm base 15 is connected to the tip portion of the first arm 13 and extends along an axis 24 that intersects (e.g., is orthogonal to) the axis 23. The arm end 16 is connected to the tip portion of the arm base 15 to pivot about the axis 24. The third arm 17 is connected to the tip portion of the arm end 16 to swing about an axis 25 that intersects (e.g., is orthogonal to) the axis 24. The tip portion 18 is connected to the tip portion of the third arm 17 to pivot about an axis 26 that intersects (e.g., is orthogonal to) the axis 25. A Work tool such as a hand, a suction nozzle, a welding torch, etc. is attached to the tip portion 18.

As described above, the robots 2B, 2C include a joint 31 connecting the base 11 and the pivoting portion 12, a joint 32 connecting the pivoting portion 12 and the first arm 13, a joint 33 connecting the first arm 13 and the second arm 14, a joint 34 connecting the arm base 15 and the arm end 16 in the second arm 14, a joint 35 connecting the arm end 16 and the third arm 17, and a joint 36 connecting the third arm 17 and the tip portion 18.

The actuators 41, 42, 43, 44, 45, 46, for example, include an electric motor and a speed reducer to drive the joints 31, 32, 33, 34, 35, 36 respectively.

For example, the actuator 41 turns the pivoting portion 12 about the axis 21, the actuator 42 swings the first arm 13 about the axis 22, the actuator 43 swings the second arm 14 about the axis 23, the actuator 44 turns the arm end 16 about the axis 24, the actuator 45 swings the third arm 17 about the axis 25, and the actuator 46 turns the tip portion 18 about the axis 26.

The configuration of the robots 2B, 2C can be modified. For example, the robots 2B, 2C may be a seven-axis redundant robot in which one joint is added to the above-described six-axis vertical articulated robot, or may be a so-called SCARA type multi joint robot.

Returning to FIG. 1, the mobile robot 2D is a robot capable of autonomous travel. The mobile robot 2D includes a robot 10 that is configured similar to the robots 2B, 2C and an automated guided vehicle 50. The automated guided vehicle 50 runs autonomously to convey the robot 10. Examples of the automated guided vehicle 50 include so-called electric automated guided vehicles (AGVs).

The production system 1 may further include an environmental sensor 5. The environmental sensor 5 detects a state of a work environment of the plurality of local devices 2 (hereinafter referred to as "environmental conditions"). Examples of the environmental sensor 5 include cameras that capture the work environment of the plurality of local devices 2, for example. The environmental sensor 5 may be a sensor that detects the presence or absence of the workpiece 9 at a predetermined position using laser light or the like, or may be a sensor that detects the size of the workpiece 9 or the like. The production system 1 may include a plurality of environmental sensors 5.

The control system 3 controls a plurality of the local device 2. Hereinafter, the configuration of the control system 3 will be described in detail.

Control System

The control system 3 operates the plurality of local devices 2 based on an operation program. The control system 3 includes a plurality of local controllers 100, a host controller 200, and a data collection device 300. The plurality of local controllers 100 control the plurality of the local device 2, respectively. For example, each of the local controllers 100 controls a corresponding local device 2 based on a predetermined operation program. For example, the plurality of local controllers 100 include a local controller 100A that controls the transport device 2A, a local controller 100B that controls a robot 2B, a local controller 100C that controls a robot 2C, and a local controller 100D that controls the mobile robot 2D.

The local controller 100A controls the transport device 2A to convey the workpiece 9 based on an operation program for conveyance control prepared in advance. The local controller 100B controls the actuators 41, 42, 43, 44, 45, 46 of the robot 2B to operate the robot 2B based on an operation program for robot control prepared in advance. The local controller 100C controls the actuators 41, 42, 43, 44, 45, 46 of the robot 2C to operate the robot 2C based on an operation program for robot control prepared in advance. The local controller 100D controls the automated guided vehicle 50 and the actuators 41, 42, 43, 44, 45, 46 of the robot 10 so as to operate the mobile robot 2D based on an operation program for robot control prepared in advance.

The host controller 200 acquires information indicating an operation state of a corresponding the local device 2 (hereinafter referred to as "operational information") from each of the plurality of the local controller 100, acquires a detection result of an environmental state (hereinafter referred to as "environmental information") from the environmental sensor 5, and outputs an instruction to execute an operation program to each of the plurality of the local controller 100 based on the acquired operational information and environmental information.

The host controller 200 is in synchronous communication with a plurality of the local controller 100. The synchronous communication means that communication with a plurality of the local controller 100 is repeatedly performed in a synchronous communication cycle synchronized with a synchronous frame of a constant cycle. The host controller 200 acquires operational information from each of the plurality of the local controller 100, acquires environmental information from the environmental sensor 5, and repeatedly outputs an execution command to any of the plurality of local controller 100 based on the operational information and the environmental information in synchronization with a cycle of synchronous communication.

The data collection device 300 collects various data acquired and generated during the control of the plurality of local devices 2 by the plurality of local controllers 100 and the host controller 200 and accumulates it in a database in a database format that can be analyzed later. The data accumulated by the data collection device 300 can be utilized for improvement of productivity in the production system 1 or preventive maintenance. The data content to be stored in the database may change in response to a configuration change of the production system 1, a change of the operational sequence of the production system 1, or the like.

In contrast, the data collection device 300 comprises: one or more data collectors configured to collect RAW data in which one or more RAW records related to operation of the industrial equipment are arranged for each of one or more categories; a data analyzer configured to acquire analysis data in which one or more analysis records are arranged for each of one or more categories, extract analysis records of a predetermined category from the analysis data based on a data arrangement of the analysis data, perform predetermined analysis processing on the extracted analysis records to generate one or more result records, and generate result data in which one or more result records are arranged for each of one or more categories; a database accessor configured to acquire registration data in which one or more registration records are arranged for each of one or more categories, convert the registration data into a predetermined database format based on the data arrangement of the registration data, and register the registration data in the database; and an application manager configured to control the flow of data among the data collector, the data analyzer, and the database accessor.

According to such a configuration, by adding at least one of the data collector and the data analyzer and changing the flow of data by the application manager, the content to be registered in the database can flexibly be expanded while maintaining the database format. Therefore, both the ease of expansion of the database and the ease of use of the database can be achieved.

Figure 3:
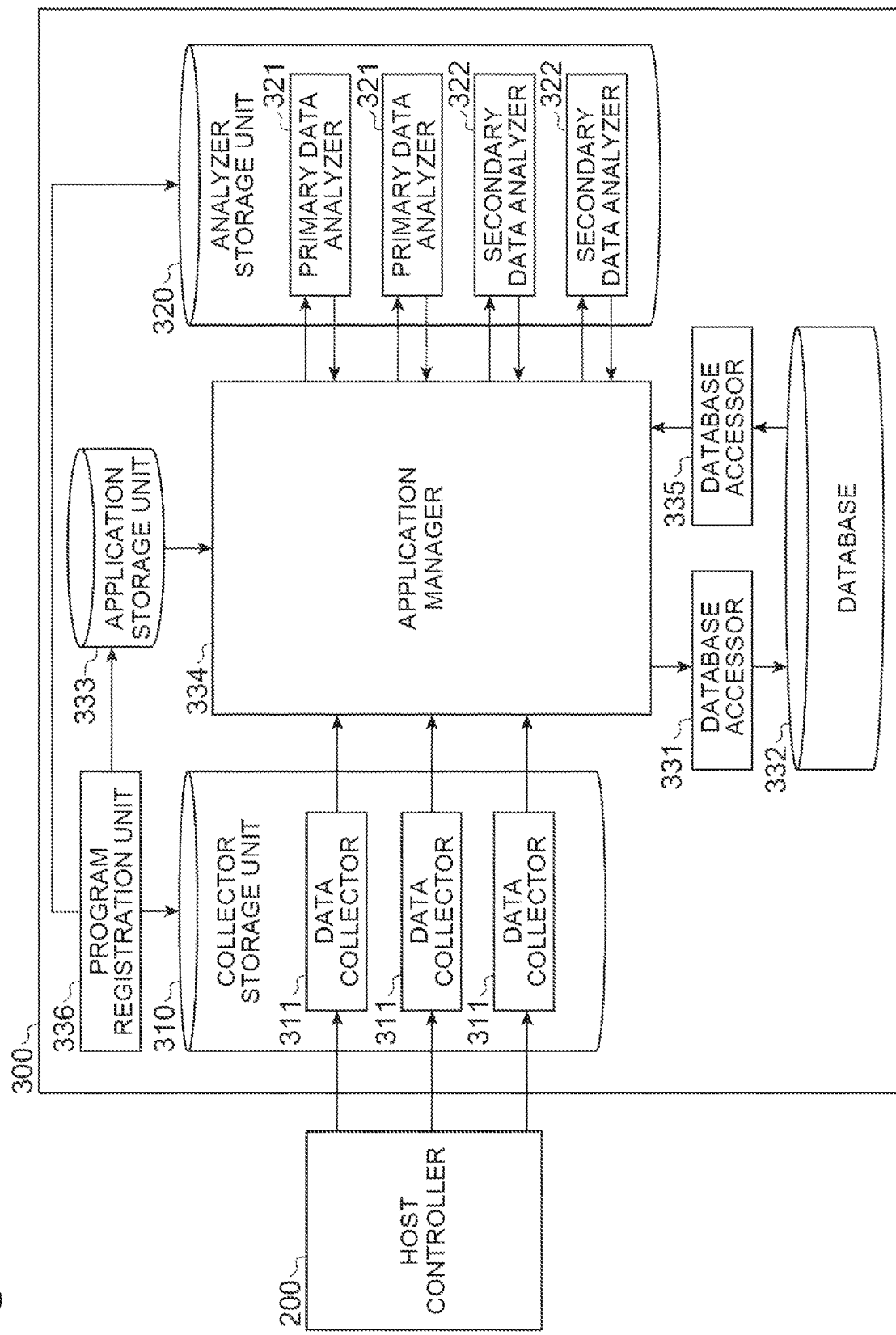
FIG. 3 is a block diagram illustrating an example configuration of a data collection device.

As illustrated in FIG. 3, for example, the data collection device 300 includes a collector storage unit 310, an analyzer storage unit 320, a database accessor 331, a database 332, an application storage unit 333, and an application manager 334.

The collector storage unit 310 stores one or more data collectors 311. For example, the collector storage unit 310 stores a plurality of data collectors 311. The one or more data collectors 311 may be one or more collector programs. For example, each of the plurality of data collectors 311 is a program library that collects RAW data in which one or more RAW records related to operations of one or more local devices 2 are arranged for each of one or more categories. For example, each of the plurality of data collectors 311 is a dynamic link library that can be dynamically linked to an executable program. The RAW record is an unprocessed record that has not been subjected to information processing by the data collection device 300.

Data in which one or more records are arranged for each one or more categories as in the above-described RAW data is hereinafter referred to as "array structure data". According to array structure data, the category of a record can be specified by the arrangement of the record in data.

Examples of array structure data include comma-delimited text data (CSV data) and tab-delimited text data. In the CSV data, one dataset including a plurality of records respectively corresponding to a plurality of categories is divided by line feed and accumulated. In each dataset, a plurality of records are arranged in a predetermined category order, and records are separated by commas. The category of each record can be specified by the position from the head in the corresponding dataset.

Array structure data may include attribute definition data that defines an attribute for each of one or more categories of one or more records. The attribute represents a property common to records belonging to the same category. Examples of the common property include what kind of a physical quantity is represented in what kind of unit and the like.

Figure 4:
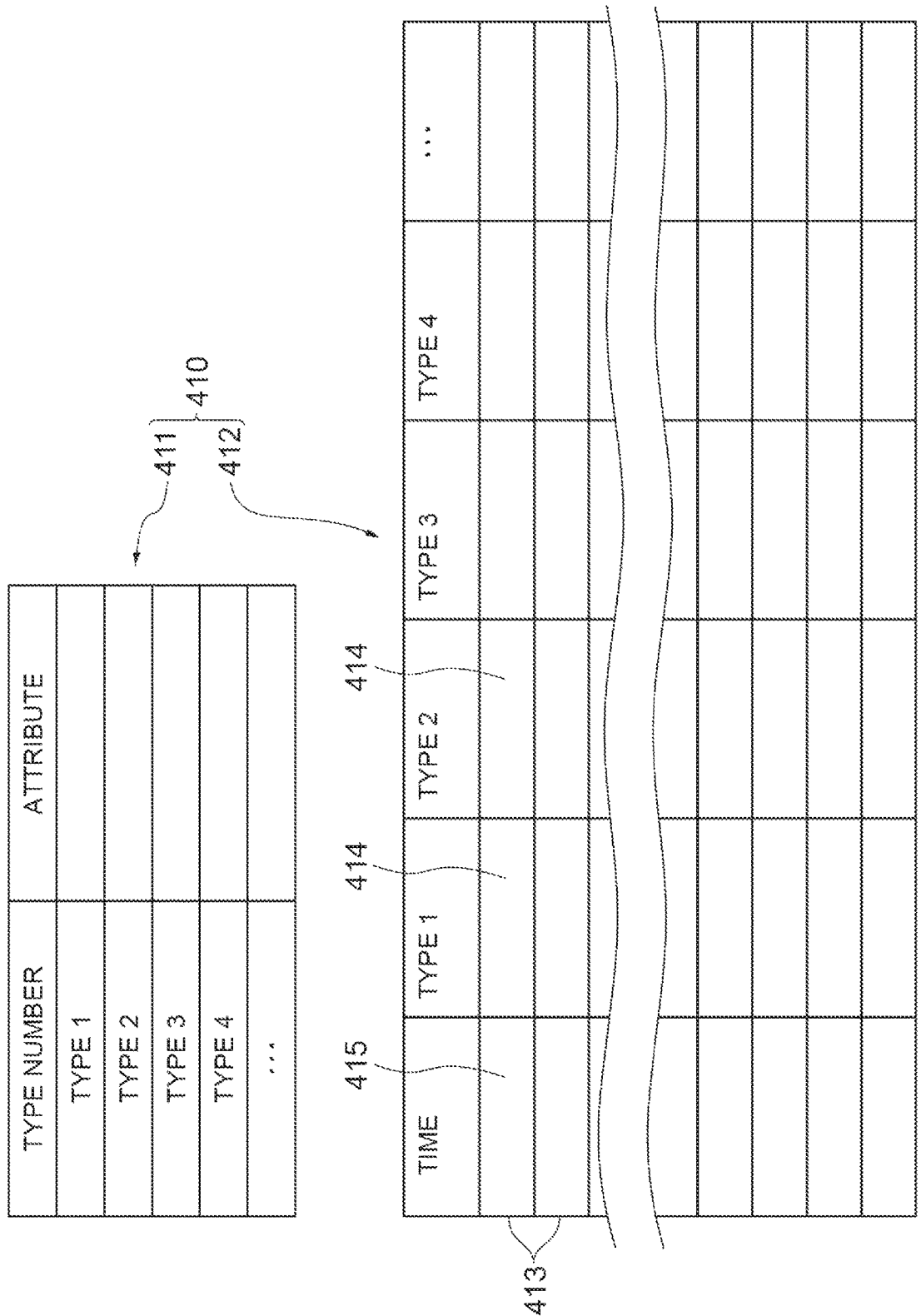
FIG. 4 is a table illustrating example array structure data.

FIG. 4 is a table illustrating the array structure data. As illustrated in FIG. 4, array structure data 410 includes a header 411 and a recording data 412. The recording data 412 is data in which a plurality of records in association with time for each of a plurality of categories. As illustrated in FIG. 4, the array structure may include one or more dimensions identifying the position of each record. The array structure may further include attribute definition data of each value of the dimensions.

For example, the recording data 412 includes multiple rows of a dataset 413. Each the dataset 413 includes a time 415 and a plurality of a record 414 respectively corresponding to a plurality of categories. Examples of the time 415 include acquisition times of a plurality of the record 414. In each the dataset 413, the plurality of the record 414 are arranged in the order of category from the left.

The header 411 corresponds to the above-described attribute definition data, and defines an attribute for each of a plurality of sequences. When the array structure data illustrated in FIG. 4 is the above-described RAW data, the header 411 defines an attribute of RAW record for each of a plurality of categories. The attribute of RAW record may be a control command for operating the local device 2, or may be a detection value of an operation result of the local device 2. Examples of attributes of the RAW record are described below.

Example 1-1) An operation amount (for example, an operation angle) of an actuator (for example, the actuators 41, 42, 43, 44, 45, 46) is represented by an angle [rad].

Example 1-2) An operational speed of an actuator is represented by an angular velocity [rad/s].

Example 1-3) The driving force generated by the actuator is represented by a torque [N·m].

Example 1-4) Drive current [A] of actuator is represented.

Example 1-5) A control command for the local device 2 is represented by target coordinates (X [m], Y [m], Z [m]) and the target posture (θx [rad], θy [rad], θz [rad]).

Example 1-6) A control mode (position control mode/torque control mode) of an actuator is represented.

The attribute of the RAW record may be environmental information based on a detection result of the environmental sensor 5.

Returning to FIG. 3, a plurality of the data collector 311 may correspond to the plurality of local devices 2, respectively, or at least one of a plurality of the data collectors 311 may correspond to two or more the local device 2. Each of the plurality of data collectors 311 may collect RAW data from the host controller 200, for example, or may collect RAW data from the local controller 100 that corresponds to the local device 2. When each of a plurality of the data collector 311 collects RAW data from the host controller 200, RAW data to which time based on a unified timer is added can be collected.

Each of the plurality of the data collector 311 may acquire RAW data generated by the host controller 200 or the local controller 100, and may accumulate RAW records collected from the host controller 200 or the local controller 100 to generate RAW data.

The analyzer storage unit 320 stores one or more primary data analyzers 321. For example, the analyzer storage unit 320 stores a plurality of primary data analyzers 321.

The one or more primary data analyzers 321 may be one or more analyzer programs. For example, each of the plurality of the primary data analyzer 321 is a program library configured to acquire analysis data in which one or more analysis records are arranged for each of one or more categories, extract analysis records of a predetermined category from the analysis data based on a data arrangement of the analysis data, generate one or more result records by performing predetermined primary analysis processing on the extracted analysis records, and generate result data in which one or more result records are arranged for each of one or more categories. For example, each of the plurality of the primary data analyzer 321 is a dynamic link library that can be dynamically linked to an executable program. The result record is a processed record subjected to the information processing by the data collection device 300.

The analysis data is also array structure data in which one or more records are arranged for each one or more categories. Each of the plurality of primary data analyzers 321 acquires RAW data collected by any one of the plurality of the data collector 311 as analysis data, and extracts RAW records of a predetermined category from the RAW data as analysis record. When the RAW data includes the above-described attribute definition data, each of the plurality of primary data analyzers 321 may extract a predetermined category of RAW records based on the attribute definition data of the RAW data.

When the RAW data arranges a plurality of RAW records in association with time for each of one or more categories, the primary data analyzer 321 may extract, from the plurality of RAW records, a RAW record whose value has changed with respect to a RAW record immediately preceding in the order of time, as one or more result records.

FIG. 5A is a graph illustrating a temporal change of RAW record represented by binary values as in the above-described control mode of the actuator, and includes a plurality of RAW records R10. A transition TR10 of the control mode is represented by the plurality of RAW records R10.

When the primary data analyzer 321 extracts, as one or more result records from a plurality of RAW records, a RAW record whose value has changed with respect to the immediately preceding RAW record in the time order, two RAW records R11, R12 are extracted from the plurality of RAW records R10 as illustrated in FIG. 5B. Based on the RAW records R11, R12 and the attribute of "representing the changing point of the control mode", the transition TR10 of the control mode can be represented in the same manner as that represented by the plurality of RAW record R10. As described above, according to the processing in which records other than the changing point are thinned out, the amount of data to represent the transition TR10 can significantly be reduced.

Another example of primary analysis processing performed by the primary data analyzer 321 is described below.

Example 2-1) RAW record indicating the operational speed of the actuator (hereinafter referred to as "speed record") and RAW record indicating the driving force of the actuator (hereinafter referred to as "force record") are extracted based on the attribute definition data of RAW data. A degradation level (an example of a result record) of the speed reducer of the actuator is generated based on the relationship between the speed record and the force record. Result data is generated by attaching a header that defines an attribute of one category as "degradation level of speed reducer" to recording data in which one or more result records are arranged in association with one category.

Example 2-2) RAW record indicating the control mode of the actuator (hereinafter referred to as "mode record") is extracted based on attribute definition data of RAW data. One or more mode records in which the value has changed with respect to the previous mode record in the time order are extracted as result records from the plurality of mode records. Result data is generated by attaching a header that defines an attribute of one category as "indicating a change point of a control mode" to recording data in which one or more result records are arranged in association with one category.

The primary data analyzer 321 may generate result data in which one or more result records are arranged in association with time for each of one or more categories. The time in the result data may be the generation time of the result record, or may be the acquisition time of the RAW record used to generate the result record.

The database accessor 331 may be a database accessor program. For example, the database accessor 331 is a program library configured to acquire registration data in which one or more registration records are arranged for each of one or more categories, convert the registration data into a predetermined database format based on the data arrangement of the registration data, and register the converted registration data in the database 332. For example, the database accessor 331 is a dynamic link library that can be dynamically linked to an executable program. The registration data is also array structure data in which one or more records are arranged for each one or more categories.

The database format is, for example, a tag structure format in which a structured tag is attached to each record. Examples of the tag structure format include a JavaScript Object Notation (JSON) format.

Figure 6:
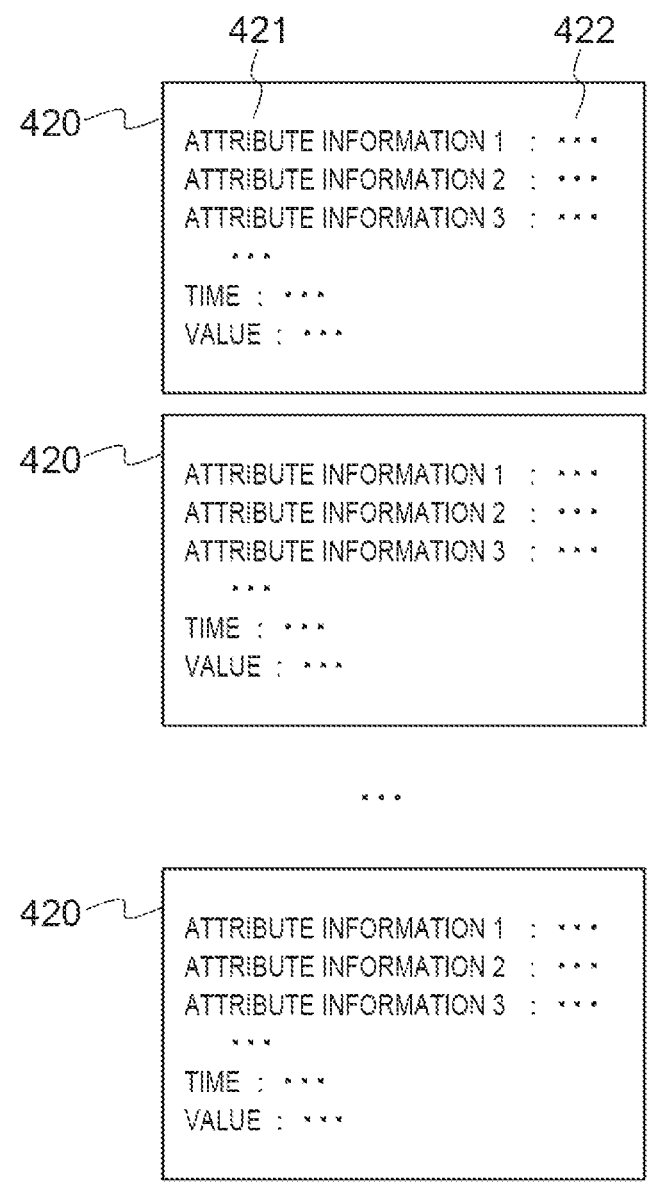
FIG. 6 is a schematic diagram illustrating example tag structure data.

FIG. 6 is a schematic diagram illustrating tag structure data obtained by converting array structure data into a tag structure format. The tag structure data includes a plurality of structured records 420. Each of the plurality of structured records 420 includes a record value 422 and a structured tag 421 attached to the record value 422.

The database accessor 331 may add a structured tag to each of one or more registration records based on the data arrangement of the registration data and register the registration records in the database 332. When the registration data includes the above-described attribute definition data, the database accessor 331 may add a structured tag indicating an attribute to each of the one or more registration records based on the category of each of the one or more registration records and the attribute definition data of the registration data.

The database accessor 331 may add a structured tag to each of the one or more registration records, the structured tag further indicating an arrangement in the category. For example, in a case where the registration data arranges a plurality of registration records in association with time for each of one or more categories, the database accessor 331 may add a structured tag further indicating time (an example of arrangement in category) to each of the plurality of registration records.

For example, the database accessor 331 acquires result data generated by any of a plurality of the primary data analyzer 321 as registration data, converts the result data into a database format based on a data arrangement of the result data, and registers the result data in the database 332.

As an example, the database accessor 331 adds a structured tag to each of the one or more result records based on the category of each of the one or more result records of the result data and the attribute definition data of the result data. For example, when the result data arranges a plurality of result records in association with time with respect to the degradation level of the speed reducer, the database accessor 331 adds a structured tag indicating the attribute "degradation level of speed reducer" and the time to each of the plurality of result records.

The database accessor 331 may further acquire RAW data collected by any of the plurality of the data collector 311 as registration data, convert the RAW data into a database format based on a data arrangement of the RAW data, and register the converted RAW data in the database 332.

As an example, the database accessor 331 may add a structured tag to each of the one or more RAW records based on a category of each of the one or more RAW records of the RAW data and attribute definition data of the RAW data. For example, when the RAW data arranges a plurality of RAW records in association with time for each of "operation amount of actuator", "operational speed of actuator", "driving force generated by actuator", and "driving current of actuator", the database accessor 331 adds a structured tag indicating the attribute "operation amount of actuator" and time to each of the plurality of RAW records belonging to "operation amount of actuator".
In addition, the database accessor 331 adds a structured tag indicating the attribute "operational speed of actuator" and time to each of the plurality of RAW records belonging to "operational speed of actuator".

The database accessor 331 adds a structured tag indicating the attribute "driving force generated by actuator" and time to each of the plurality of RAW records belonging to the "driving force generated by actuator". The database accessor 331 adds a structured tag indicating "drive current of actuator", which is an attribute, and time to each of the plurality of RAW records belonging to "drive current of actuator".

The application manager 334 controls the flow of data among the data collector 311, the primary data analyzer 321, and the application storage unit 333.

For example, the application manager 334 controls the transfer of array structure data among the data collector 311, the primary data analyzer 321, and the application storage unit 333 based on an application program stored in the application storage unit 333. The transfer of array structure data includes storing array structure data in a predetermined storage area and transferring a reference to the storage area. The application program is, for example, a program in an execution format.

As an example, the application program may include the following processing.

Processing 1-1) activating one of a plurality of data collectors 311 at a predetermined time, and storing RAW data collected by the activated the data collector 311 in a first storage area Processing 1-2) activating any one of a plurality of primary data analyzers 321 while passing a reference to a first storage area as a storage area of analysis data, and storing a result record generated by the activated primary data analyzer 321 in a second storage area Processing 1-3) activating the database accessor 331 while passing a reference to a second storage area as a storage area of registration data, and converting result data into database format by the started the database accessor 331 and registering in the database 332

The application manager 334 may cause the primary data analyzer 321 to acquire RAW data collected by the data collector 311 as analysis data and causes the database accessor 331 to acquire result data generated by the primary data analyzer 321 as registration data.

The application program may further include the following processing.

Processing 2-1) activating the database accessor 331 while passing reference to a first storage area as a storage area of registration data, and converting RAW record into database format by the started database accessor 331 and registering in the database 332

The application manager 334 may cause the database accessor 331 to further acquire RAW data collected by the data collector 311 as registration data.

Whether the application manager 334 causes the database accessor 331 to acquire RAW data depends on whether the application program includes the processing 2-1. Thus, the application storage unit 333 is an example of a setting storage unit that stores a necessity setting for determining whether registration of RAW data is necessary. In addition, the application manager 334 switches whether to cause the database accessor 331 to acquire RAW data as registration data based on the necessity setting in the setting storage unit.

The application program may be configured to switch between execution and non-execution of the processing 2-1 based on one or more result records generated by the primary data analyzer 321. The application manager 334 may switch whether to cause the database accessor 331 to acquire RAW data as registration data based on one or more result records generated by the primary data analyzer 321.

As an example, the application program may be configured such that the processing 2-1 is executed when abnormality is recognized in one or more result records generated by the primary data analyzer 321, and the processing 2-1 is not executed when abnormality is not recognized in one or more result records generated by the primary data analyzer 321.

The data collection device 300 may further include a database accessor 335, and the analyzer storage unit 320 may further store one or more secondary data analyzers 322. The analyzer storage unit 320 may store a plurality of secondary data analyzers 322.

The database accessor 335 (second database accessor) generates secondary data in which one or more secondary records are arranged for each of one or more categories based on data read from the database 332. The secondary data is also array structure data in which one or more records are arranged for each one or more categories.

The database accessor 335 may arrange the secondary records based on a structured tag added to each of the secondary records. For example, the database accessor 335 reads data including a plurality of structured records from the database 332, generates attribute definition data of array structure data based on the structured tag included in each structured record, and arranges the record value included in each structured record for each of one or more categories based on the attribute definition data.

The one or more secondary data analyzers 322 may be one or more analyzer programs. For example, each of the plurality of second data analyzers 322 (the secondary data analyzer) is a program library that acquires secondary analysis data in which one or more secondary analysis records are arranged for each of one or more categories, extracts secondary analysis records of a predetermined category from the secondary analysis data based on the data arrangement of the secondary analysis data, performs predetermined secondary analysis processing (second analysis processing) on the extracted secondary analysis records to generate one or more secondary result records, and generates secondary result data in which one or more secondary result records are arranged for each of one or more categories.

For example, each the secondary data analyzer 322 acquires the secondary data generated by the database accessor 335 as secondary analysis data, extracts secondary analysis records of a predetermined category from the secondary data based on the data arrangement of the secondary data, performs secondary analysis processing on the extracted secondary analysis records to generate one or more secondary result records, and generates secondary result data in which one or more secondary result records are arranged for each of one or more categories.

Examples of the secondary analysis processing performed by the database accessor 335 and the secondary data analyzer 322 are described below.

Example 3-1) The database accessor 335 reads, from the database 332, data including a plurality of structured tags to which structured tags indicating time within a predetermined period and the "degradation level of speed reducer" described above are assigned. The database accessor 335 generates a secondary record including recording data in which records of a plurality of read structured tags are arranged in association with time and attribute definition data in which the attribute of category is set to "degradation level of speed reducer". The secondary data analyzer 322 extracts secondary analysis records indicating the degradation level of the speed reducer from the secondary record. Based on the secondary analysis record, the secondary data analyzer 322 derives a maintenance recommendation time at which the degradation level of the speed reducer reaches a predetermined level as a secondary result record. The secondary data analyzer 322 generates secondary result data in which a header that defines an attribute of one category as "maintenance recommendation time of speed reducer" is added to recording data in which one or more result records are arranged in association with one category.

Figure 7:
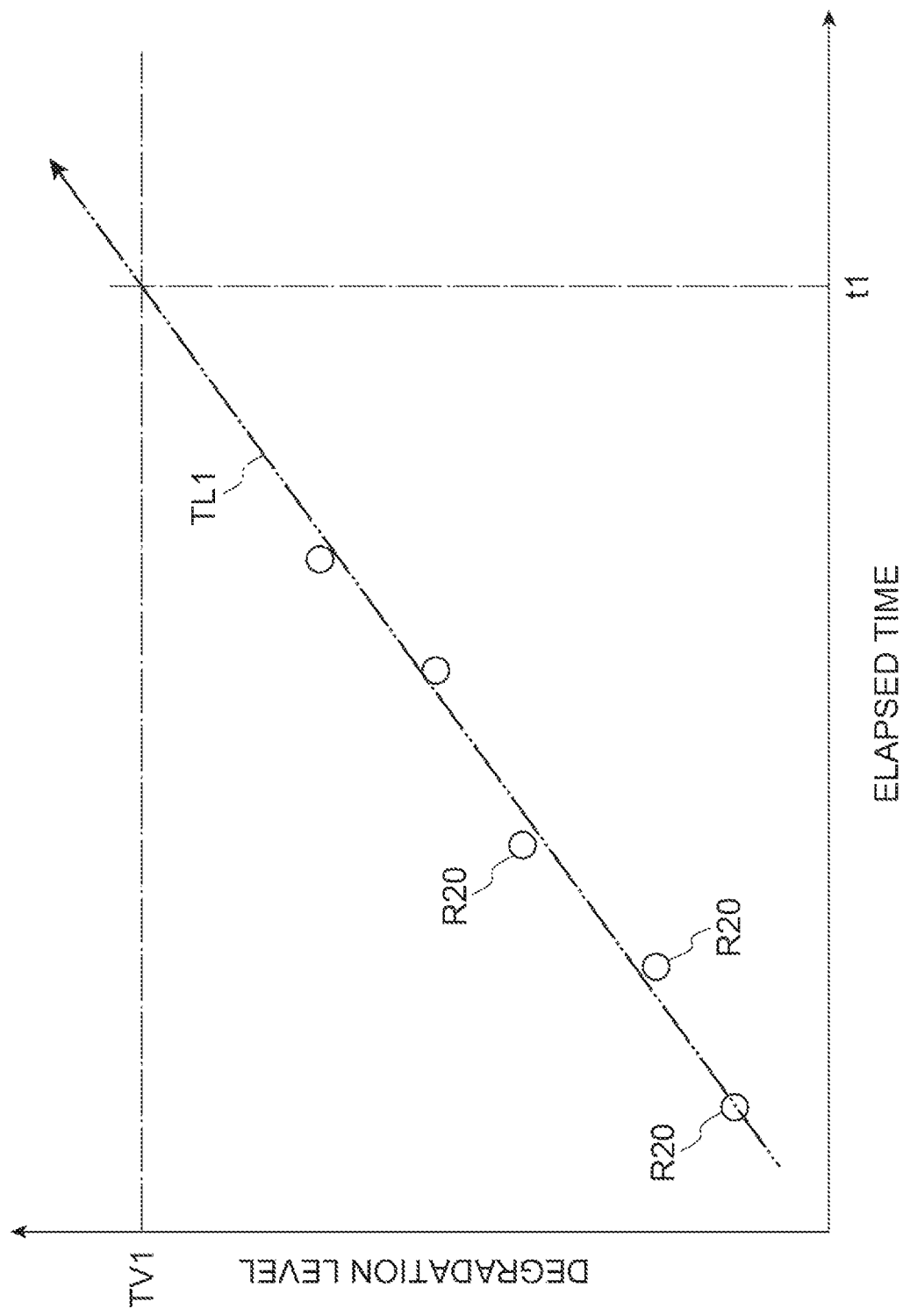
FIG. 7 is a graph for illustrating example secondary analysis.

FIG. 7 is a graph schematically illustrating derivation of the recommended maintenance time. In FIG. 7, the horizontal axis represents elapsed time and the vertical axis represents degradation level of the speed reducer. The secondary data analyzer 322 derives a degradation tendency line TL1 based on a plurality of result records R20, and derives an elapsed time t1 at which a threshold TV1 for recommending maintenance and the degradation tendency line TL1 intersect as a maintenance recommendation time.

If the data collection device 300 further includes the database accessor 335 and the analyzer storage unit 320 further stores the secondary data analyzer 322, the application program may further include the following processing.

Processing 3-1) activating the database accessor 335 at a predetermined time, and storing secondary data generated by the activated database accessor 335 in a third storage area Processing 3-2) activating any one of a plurality of secondary data analyzers 322 while passing a reference to the third storage area as a storage area of the secondary analysis data, and storing a secondary result record generated by the activated secondary data analyzer 322 in a fourth storage area Processing 3-3) activating the database accessor 331 while passing a reference to a fourth storage area as a storage area of registration data, and converting secondary result data into database format by the started the database accessor 331 and registering in the database 332

The application manager 334 may cause the secondary data analyzer 322 to acquire secondary data generated by the database accessor 335 as secondary analysis data, and causes the database accessor 331 to acquire secondary result data generated by the secondary data analyzer 322 as registration data. The database accessor 331 further acquires the secondary result data, converts the secondary result data into the database format based on the data arrangement of the secondary result data, and further registers the database.

The analyzer storage unit 320 may store identification information of the secondary data analyzer 322 and record category for secondary analysis processing in association with each other. The application manager 334 may cause the database accessor 335 to generate secondary data by specifying a read target from the database 332 based on the record category associated with the secondary data analyzer 322 in the analyzer storage unit 320. For example, the application manager 334 may designate the attribute definition data of the secondary data based on the attribute definition data of the analysis data of secondary data analyzer 322. The database accessor 335 may generate the secondary data according to the designated attribute definition data. For example, the database accessor 335 may arrange the secondary records based on the designated attribute definition data and a structured tag added to each of the secondary records.

The data collection device 300 may further include a program registration unit 336. The program registration unit 336 acquires a new application program created by the user and stores it in the application storage unit 333.

The data collector 311, the primary data analyzer 321, the secondary data analyzer 322, the database accessor 331, the database accessor 335 and the like used by the application program are held by the data collection device 300. For this reason, an application program can readily be created by a simple operation of defining a combination of the data collector 311, the primary data analyzer 321, the secondary data analyzer 322, the database accessor 331, and the database accessor 335, a flow of array structure data, a time to execute, and the like.

As described above, the application program includes a necessity setting for determining whether registration of RAW data is necessary. For this reason, the program registration unit 336 is an example of a setting acquisition unit that acquires a necessity setting that determines whether registration of RAW data is necessary and stores it in a setting storage unit.

The program registration unit 336 may be configured to further perform acquiring and storing the data collector 311 created by the user on the collector storage unit 310. the RAW data to be collected can flexibly expanded by adding the data collector 311 in accordance with addition of the local device 2 or the like.

The program registration unit 336 may be configured to further perform acquiring and storing the primary data analyzer 321 or the secondary data analyzer 322 created by the user in the analyzer storage unit 320. The contents of primary analysis processing and secondary analysis processing can be flexibly modified.

Figure 8:
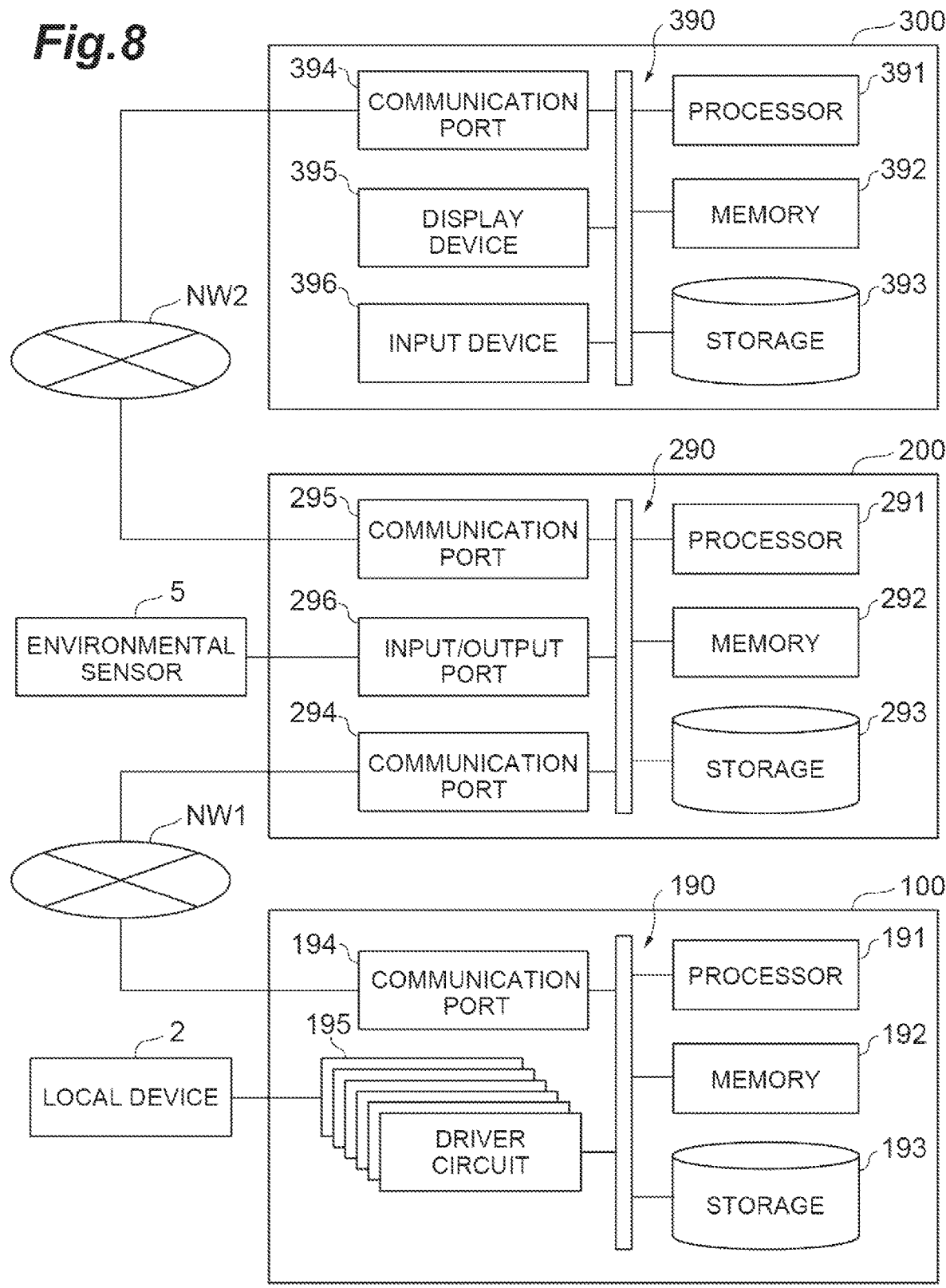
FIG. 8 is a block diagram illustrating an example hardware configuration of the control system.

FIG. 8 is a block diagram illustrating the hardware configuration of the control system 3. As illustrated in FIG. 8, the local controller 100 includes circuitry 190. The circuitry 190 includes one or more processor(s) 191, a memory 192, storage 193, a communication port 194, and a driver circuit 195. The storage 193 includes a computer-readable storage medium, such as a nonvolatile semiconductor memory. The storage 193 stores a control program for causing the local controller 100 to perform control of the local device 2 based on the operation program.

The memory 192 temporarily stores the program loaded from the storage medium of the storage 193 and the calculation result by the processor(s) 191. The processor(s) 191 configures each functional block of the local controller 100 by executing the program in cooperation with the memory 192. The communication port 194 communicates with the host controller 200 via a first network line NW1 in accordance with instructions from the processor(s) 191. The driver circuit 195 outputs drive power to the local device 2 in accordance with instructions from the processor(s) 191.

The host controller 200 includes circuitry 290. The circuitry 290 includes one or more processor(s) 291, a memory 292, storage 293, communication ports 294, 295, and an input/output port 296. The storage 293 includes a computer-readable storage medium, such as a nonvolatile semiconductor memory. The storage 293 stores a program for causing the host controller 200 to acquire operational information and environmental information and to output an instruction to execute an operation program based on the operational information and the environmental information.

The memory 292 temporarily stores the program loaded from the storage medium of the storage 293 and the calculation result by the processor(s) 291. The processor(s) 291 configures each functional block of the host controller 200 by executing the program in cooperation with the memory 292. The communication port 294 communicates with the local controller 100 via the first network line NW1 in accordance with instructions from the processor(s) 291. A communication port 295 communicates with the data collection device 300 via a second network line NW2 in accordance with instructions from the processor(s) 291. The input/output port 296 inputs and outputs information to and from the environmental sensor 5 in accordance with instructions from the processor(s) 291.

The data collection device 300 includes circuitry 390. The circuitry 390 includes one or more processor(s) 391, a memory 392, storage 393, a communication port 394, a display device 395, and an input device 396. The storage 393 includes a computer-readable storage medium, such as a nonvolatile semiconductor memory. The storage 393 further includes, as storage units of programs, the collector storage unit 310, the analyzer storage unit 320, the application storage unit 333, storage units of the database accessor 331 and the database accessor 335, and a storage unit of a base program (e.g., an operating system) for configuring the application manager 334 and the program registration unit 336 into the data collection device 300. Further, the storage 393 includes a storage unit of the database 332.

The memory 392 temporarily stores the program loaded from the storage medium of the storage 393 and the calculation result by the processor(s) 391. The processor(s) 391 configures each functional block of the data collection device 300 by executing the program in cooperation with the memory 392. The communication port 394 communicates with the host controller 200 via the second network line NW2 in accordance with instructions from the processor(s) 391. The display device 395 and the input device 396 serve as a user interface for the data collection device 300. The display device 395 includes, for example, a liquid crystal monitor, and is used to display information to the user. The input device 396 is, for example, a keypad or the like, and acquires input information by the user. The display device 395 and the input device 396 may be integrated like a so-called touch panel. The display device 395 and the input device 396 may be provided in an external device connected to the data collection device 300 or may be incorporated in the data collection device 300.

Note that circuitry 190, 290, 390 may not be limited to one in which each function is configured by a program. For example, at least a part of the functions of the circuitry 190, 290, 390 may be configured by a dedicated logic circuit or an application specific integrated circuit (ASIC) in which the dedicated logic circuit is integrated.

Data Collection Procedure

Next, an example data collection procedure executed by the data collection device 300 will be described in detail as an example of the data collection method. The procedure includes: collecting, from the industrial equipment, RAW data in which one or more RAW records are arranged for one or more categories; acquiring RAW data, extracting analysis records of a predetermined category from the RAW data based on a data arrangement of the RAW data, performing predetermined analysis processing on the extracted analysis records to generate one or more result records, and generating result data in which one or more result records are arranged for each of one or more categories; and acquiring the result data, converting the result data into a predetermined database format based on the data arrangement of the result data, and registering in the database.

For example, the data collection procedure includes a program registration procedure, a primary analysis procedure, a RAW data registration procedure, and a secondary analysis procedure. Hereinafter, each procedure will be described in detail.

Program Registration Procedure

Figure 9:
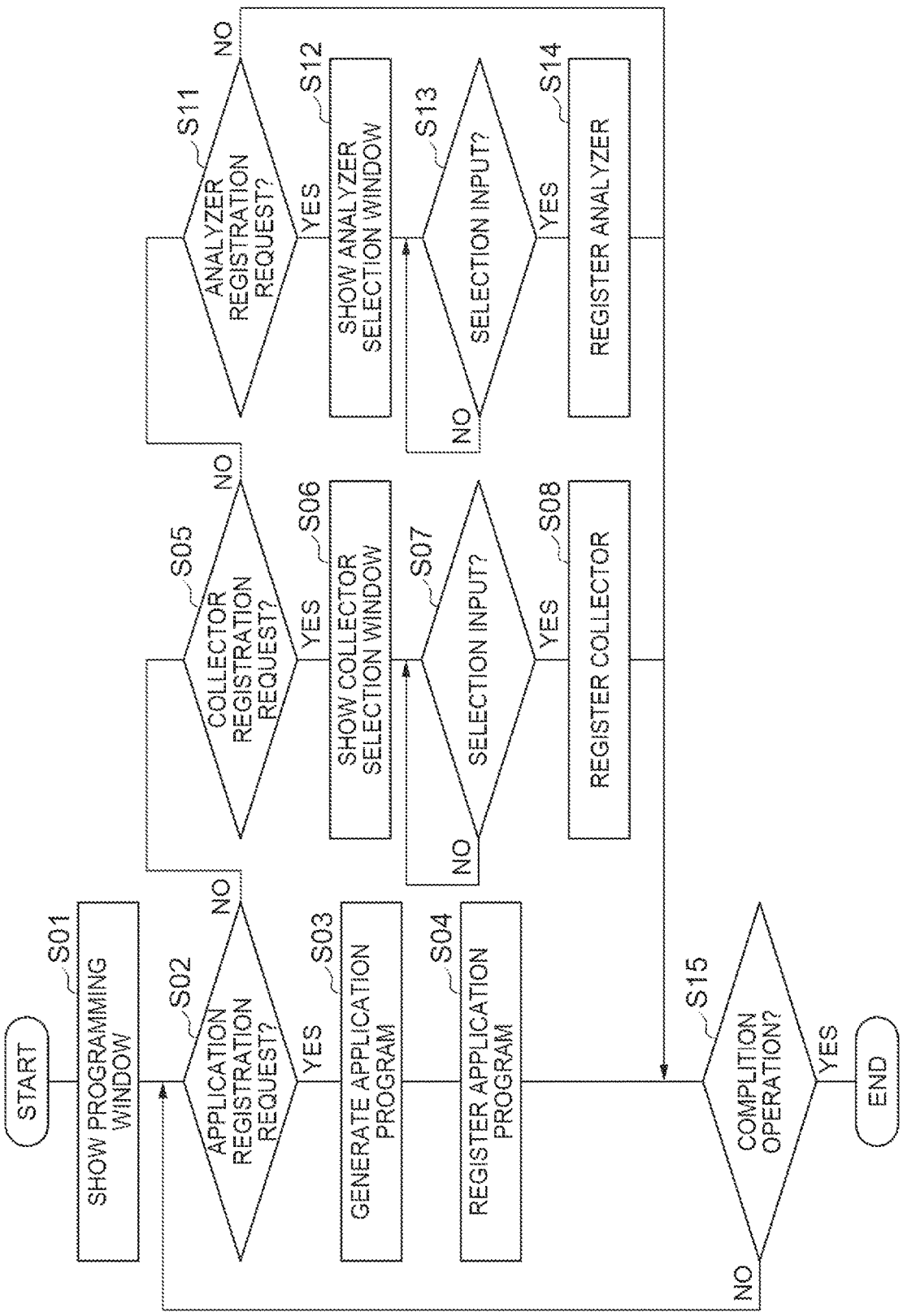
FIG. 9 is a flowchart illustrating an example program registration procedure.

As illustrated in FIG. 9, the data collection device 300 first executes operations S01 and S02. In operation S01, the program registration unit 336 causes the display device 395 to display a programming window. The programming window includes, for example, an application definition area that defines a combination of the data collector 311, the primary data analyzer 321, the secondary data analyzer 322, the database accessor 331, and the database accessor 335, a flow of array structure data, a time to execute, an application registration section (e.g., a button) that requests registration of an application program, a collector registration section (e.g., a button) that requests registration of the data collector 311, and an analyzer registration section (e.g., a button) that requests registration of a primary data analyzer or a secondary data analyzer. In operation S02, the program registration unit 336 checks whether registration of the application program has been requested by the application registration section.

If it is determined in operation S02 that registration of the application program has been requested, the data collection device 300 executes operations S03 and S04. In operation S03, the program registration unit 336 generates an application program based on the content input to the application definition region. In operation S04, the program registration unit 336 stores the application program in the application storage unit 333.

If it is determined in operation S02 that registration of the application program is not requested, the data collection device executes operation S05. In operation S05, the program registration unit 336 confirms whether registration of the data collector 311 is requested by the collector registration section.

If it is determined in operation S05 that registration of the data collector 311 is requested, the data collection device executes operations S06, S07, and S08. In operation S06, the program registration unit 336 displays a collector selection window for selecting one or more new data collectors 311 generated in advance in the display device 395. In operation S07, the program registration unit 336 waits for a selection input on the collector selection window. In operation S08, the program registration unit 336 stores the one or more new data collectors 311 selected in the collector selection window in the collector storage unit 310.

If it is determined in operation S05 that registration of the data collector 311 is not requested, the data collection device 300 executes operation S11. In operation S11, the program registration unit 336 checks whether registration of the primary data analyzer 321 or the secondary data analyzer 322 is requested by the analyzer registration section.

If it is determined in operation S11 that registration of the primary data analyzer 321 or the secondary data analyzer 322 is requested, the data collection device 300 performs operations S12, S13, and S14. In operation S12, the program registration unit 336 causes the display device 395 to display an analyzer selection window for selecting one or more new primary data analyzers 321 or the secondary data analyzers 322 generated in advance. In operation S13, the program registration unit 336 waits for a selection input on the analyzer selection window.

In operation S14, the program registration unit 336 stores one or more new primary data analyzers 321 or the secondary data analyzers 322 selected in the analyzer selection window in the analyzer storage unit 320. When the secondary data analyzer 322 is stored in the analyzer storage unit 320, the program registration unit 336 may store identification information of the secondary data analyzer 322 and a record category for secondary analysis processing in the analyzer storage unit 320 in association with each other.

After operations S04, S08, or S14, the data collection device 300 executes operation S15. If it is determined in operation S11 that registration of the primary data analyzer 321 and the secondary data analyzer 322 is not requested, the data collection device 300 also executes operation S15. In operation S15, the program registration unit 336 checks whether an input to complete programming has been made in the programming window.

If it is determined in operation S15 that no input is made to complete programming, the data collection device 300 returns processing to operation S02. If it is determined in operation S15 that an input to complete programming is made, the program registration procedure is completed.

Primary Analysis Procedure

Figure 10:
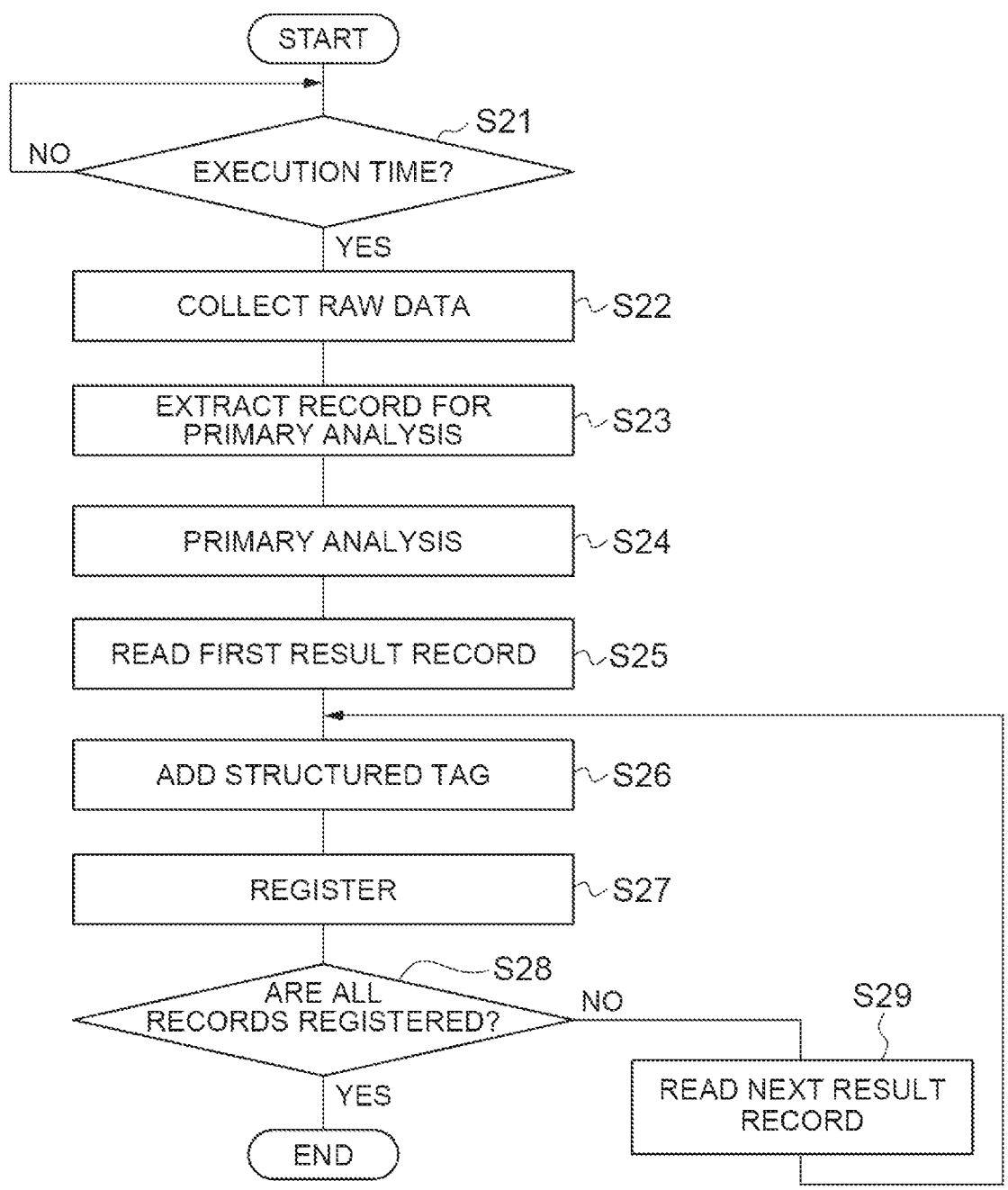
FIG. 10 is a flow chart illustrating an example primary analysis procedure.

As is apparent from the foregoing description, the data collection device 300 may perform multiple categories of primary analysis procedures. FIG. 10 is a flowchart illustrating a procedure for performing one of the primary analysis procedures. Hereinafter, among a plurality of categories of primary analysis processes, one primary analysis process targeted by the flowchart of FIG. 10 is simply referred to as "primary analysis process".

As illustrated in FIG. 10, the data collection device 300 first executes operations S21, S22, S23, S24, S25, S26, S27, and S28. In operation S21, the application manager 334 waits for the run time of primary analysis processing.

In operation S22, the application manager 334 activates one or more data collectors 311 for collecting RAW data for primary analysis processing among a plurality of the data collector 311. Each of the one or more activated data collector 311 collects RAW data. In operation S23, the application manager 334 activates the primary data analyzer 321 for primary analysis processing using the RAW data collected in operation S22 as analysis data. The activated primary data analyzer 321 acquires the specified RAW data and extracts the primary analysis records from the RAW data.

In operation S24, the primary data analyzer 321 performs primary analysis processing on the analysis records extracted in operation S23 to generate one or more result records, and generates result data in which one or more result records are arranged for each of one or more categories. In operation S25, the application manager 334 activates the database accessor 331 using the result data generated in operation S24 as registration data. The database accessor 331 acquires the specified result data and reads the first result record from the result data.

In operation S26, the database accessor 331 generates a structured record by adding a structured tag to the result record based on the data arrangement of the result data. In operation S27, the database accessor 331 stores the structured record in the database 332. In operation S28, the database accessor 331 checks whether registration of all result records in result data is completed.

If it is determined in operation S28 that an unregistered result record remains in the result data, the data collection device 300 executes operation S29. In operation S29, the database accessor 331 reads the next result record from the result data. Thereafter, the data collection device 300 returns processing to operation S26. Thereafter, reading, structuring, and registration of the result record are repeated until registration of all result records in the result data is completed.

If it is determined in operation S28 that the registration of all result records in the result data is completed, the primary analysis procedure is completed. The data collection device 300 repeatedly executes the above processing.

Raw Data Registration Procedure

Figure 11:
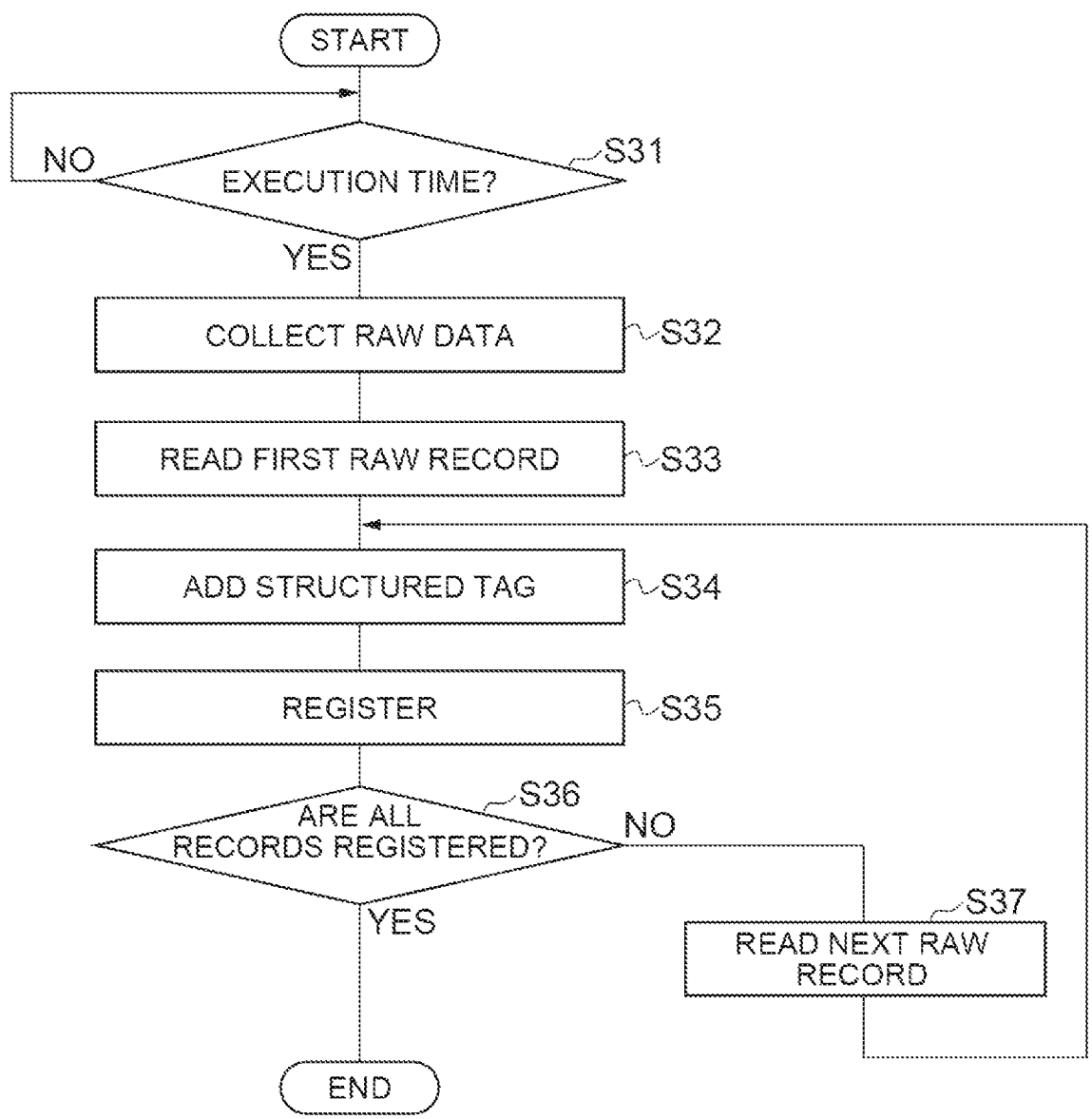
FIG. 11 is a flowchart illustrating an example registration procedure of RAW record.

As is apparent from the above description, the data collection device 300 may acquire multiple categories of RAW data. FIG. 11 is a flowchart illustrating a procedure for registering any one of RAW data. Hereinafter, one RAW data targeted by the flowchart of FIG. 11 among a plurality of categories of RAW data is simply referred to as "RAW data".

As illustrated in FIG. 11, the data collection device 300 first executes operations S31, S32, S33, S34, S35, and S36. In operation S31, the application manager 334 waits for the collection time of RAW data. In operation S32, the application manager 334 activates the data collector 311 for collecting RAW data. Each activated the data collector 311 collects RAW data.

In operation S33, the application manager 334 activates the database accessor 331 using the RAW data collected in operation S32 as registration data. The database accessor 331 acquires the designated RAW data and reads out the first RAW record from the RAW data.

In operation S34, the database accessor 331 generates a structured record by adding a structured tag to the RAW record based on the data arrangement of the RAW data. In operation S35, the database accessor 331 stores the structured record in the database 332. In operation S36, the database accessor 331 checks whether registration of all RAW records in RAW data has been completed.

If it is determined in operation S36 that an unregistered RAW record remains in the RAW data, the data collection device 300 executes operation S37. In operation S37, the database accessor 331 reads the next RAW record from the RAW data. Thereafter, the data collection device 300 returns processing to operation S34. Thereafter, reading, structuring, and registration of the RAW record are repeated until registration of all the RAW records in the RAW data is completed.

If it is determined in operation S36 that the registration of all the RAW records in the RAW data is completed, the registration procedure of the RAW data is completed. The data collection device 300 repeatedly executes the above processing.

Secondary Analysis Procedure

Figure 12:
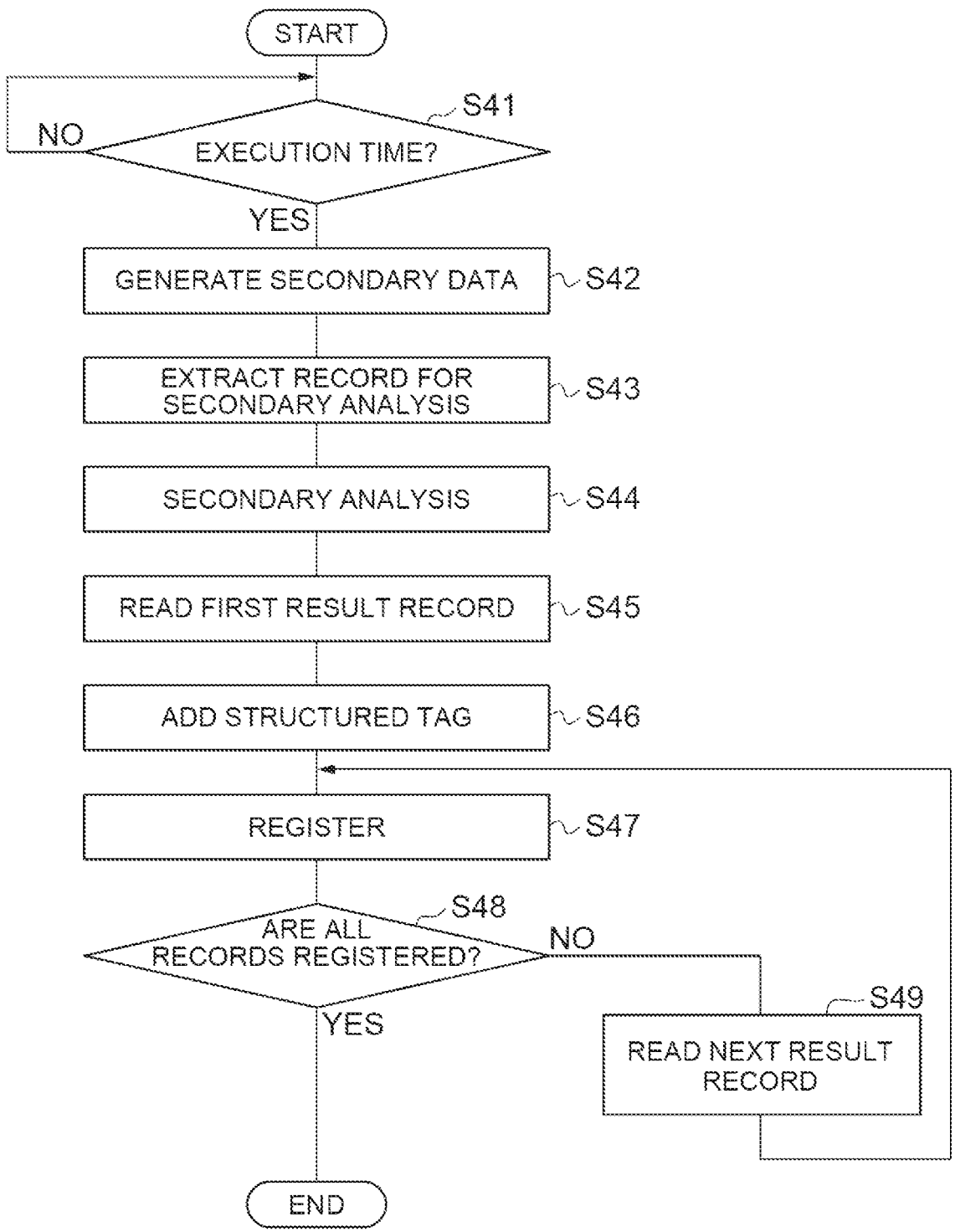
FIG. 12 is a flow chart illustrating an example secondary analysis procedure.

As is apparent from the foregoing description, the data collection device 300 may perform multiple categories of secondary analysis processing. FIG. 12 is a flowchart illustrating a procedure for performing any one secondary analysis processing. Hereinafter, among the plurality of categories of secondary analysis processing, one secondary analysis processing targeted by the flowchart of FIG. 12 is simply referred to as "secondary analysis processing".

As illustrated in FIG. 12, the data collection device 300 first executes operations S41, S42, S43, S44, S45, S46, S47, and S48. In operation S41, the application manager 334 waits for the time to execute secondary analysis processing.

In operation S42, the application manager 334 specifies read target from the database 332 based on record category for secondary analysis processing and causes the database accessor 335 to generate secondary data. For example, the application manager 334 specifies read target from the database 332 based on record category associated with the secondary data analyzer 322 for secondary analysis processing in the analyzer storage unit 320.

In operation S43, the application manager 334 activates the secondary data analyzer 322 for secondary analysis processing using the secondary data generated in operation S42 as secondary analysis data. The activated secondary data analyzer 322 acquires the specified secondary data and extracts the secondary analysis records from the secondary data.

In operation S44, the secondary data analyzer 322 performs secondary analysis processing on the secondary analysis records extracted in operation S43 to generate one or more secondary result records, and generates secondary result data in which one or more secondary result records are arranged for each of one or more categories.

In operation S45, the application manager 334 activates the database accessor 331 using the secondary result data generated in operation S44 as registration data. The database accessor 331 acquires the specified secondary result data, and reads the first secondary result record from the secondary result data.

In operation S46, the database accessor 331 generates a structured record by adding a structured tag to the secondary result record based on the data arrangement of the secondary result data. In operation S47, the database accessor 331 stores the structured record in the database 332. In operation S48, the database accessor 331 checks whether registration of all secondary result records in the secondary result data is completed.

If it is determined in operation S48 that an unregistered secondary result record remains in the secondary result data, the data collection device 300 executes operation S49. In operation S49, the database accessor 331 reads the next secondary result record from the secondary result data. Thereafter, the data collection device 300 returns processing to operation S46. Thereafter, reading, structuring, and registration of the secondary result record are repeated until registration of all the secondary result records in the secondary result data is completed.

If it is determined in operation S48 that the registration of all secondary result records in the secondary result data is completed, the secondary analysis procedure is completed. The data collection device 300 repeatedly executes the above processing.

Modified Example of Raw Data Registration Procedure

As described above, the application manager 334 may switch whether to cause the database accessor 331 to acquire RAW data as registration data based on one or more result records generated by the primary data analyzer 321. The registration procedure of RAW data will be described.

Figure 13:
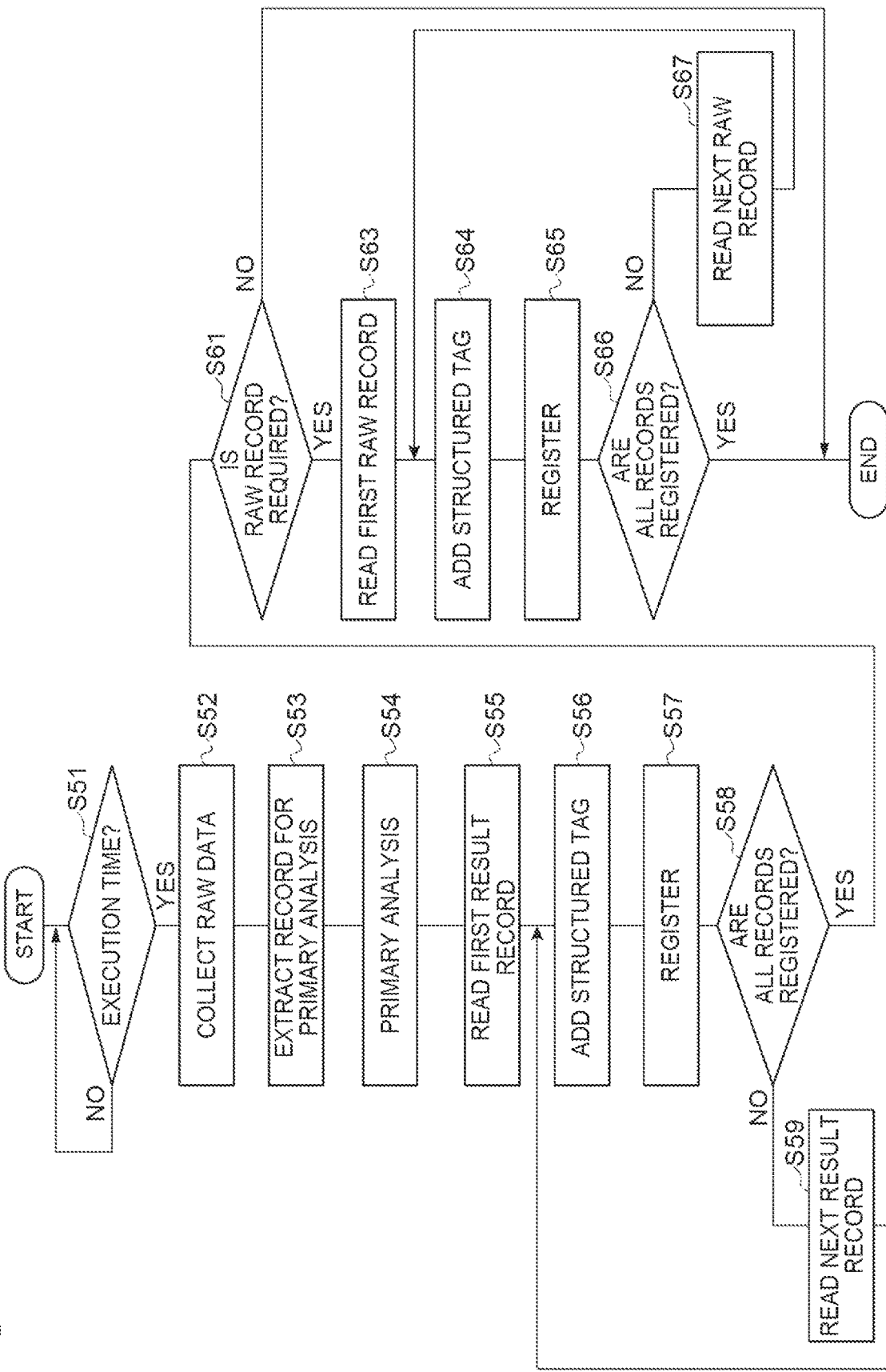
FIG. 13 is a flow chart that supports a variation of the RAW record registration procedure.

As illustrated in FIG. 13, the data collection device 300 first executes operations S51 to S59 which are the same primary analysis procedure as operations S21 to S29. Thereafter, the data collection device 300 executes operation S61. In operation S61, the application manager 334 checks whether registration of RAW data is necessary based on one or more result records generated by the primary data analyzer 321 in the primary analysis processing.

If it is determined in operation S61 that registration of RAW data is necessary, the data collection device 300 executes operations S63 to S67 which are the same RAW data registration procedures as in operations S33 to S37. If it is determined in operation S61 that registration of RAW data is unnecessary, the data collection device 300 omits registration of RAW data. The registration procedure of RAW data is thus completed.

As described above, the data collection device 300 includes: one or more data collector 311 configured to collect RAW data in which one or more RAW records related to the operation of industrial equipment are arranged for each of one or more categories; the primary data analyzer 321 configured to acquire analysis data in which one or more analysis records are arranged for each of one or more categories, extract analysis records of a predetermined category from the analysis data based on a data arrangement of the analysis data, perform predetermined analysis processing on the extracted analysis records to generate one or more result records, and generate result data in which one or more result records are arranged for each of one or more categories; the database accessor 331 configured to acquire registration data in which one or more registration records are arranged for each of one or more categories, convert the registration data into a predetermined database format based on a data arrangement of the registration data, and register the converted registration data in the database 332; and the application manager 334 configured to control the flow of data among the data collector 311, the primary data analyzer 321, and the database accessor 331.

According to this the data collection device 300, by adding at least one of the data collector 311 and the primary data analyzer 321 and changing the flow of data by the application manager 334, it is possible to flexibly expand the content registered in the database 332 while maintaining the database format. Therefore, both the ease of expansion of the database 332 and the ease of utilization of the database 332 can be achieved.

The database format may be a tag structure format in which a structured tag is added to each record and the database accessor 331 may be configured to add a structured tag to each of one or more registration records based on the data arrangement of the registration data and register the registration records in the database 332. Data registration in the tag structure format further improves ease of use of the database 332.

The registration data may include attribute definition data defining an attribute for each of one or more categories of one or more registration records and the database accessor 331 may be configured to add a structured tag indicating an attribute to each of the one or more registration records based on the category of each of the one or more registration records and the attribute definition data of the registration data. A structured tag can readily be attached to each record.

The database accessor 331 may be configured to add a structured tag further indicating the arrangement in the category to each of the one or more registration records. A more precise structured tag can readily be attached to each record.

The application manager 334 may be configured to cause the primary data analyzer 321 to acquire, as the analysis data, the RAW data collected by the data collector 311 and cause the database accessor 331 to acquire, as the registration data, the result data generated by the primary data analyzer 321. The processing load on the database 332 is reduced compared to performing analysis processing by reading data registered once in the database 332.

The RAW data may include attribute definition data defining an attribute for each of one or more categories of the one or more RAW records, and the primary data analyzer 321 may be configured to extract the analysis records of the predetermined category based on the attribute definition data of the RAW data. The analysis records can readily be extracted.

The application manager 334 may be configured to cause the database accessor 331 to further acquire the RAW data collected by the data collector 311 as the registration data. By registering the RAW data in the database 332 in addition to the result data, the database 332 that is flexibly adaptable to various future applications can be constructed.

The data collection device 300 may further include a setting acquisition unit (the program registration unit 336) configured to acquire a necessity setting for determining whether registration of the RAW data is necessary and store the necessity setting in a setting storage unit (the application storage unit 333), and the application manager 334 may be configured to switch whether or not to cause the database accessor 331 to acquire the RAW data collected by the data collector 311 as registration data based on the necessity setting of the setting storage unit. By omitting the database registration of the RAW data which is not necessary for the user, the processing load on the database 332 can be reduced.

The application manager 334 may be configured to switch whether to cause the database accessor 331 to acquire the RAW data collected by the data collector 311 as the registration data based on the one or more result records generated by the primary data analyzer 321. Selection of the RAW data can be supported.

The data collection device 300 may further include: the database accessor 335 configured to generate secondary data in which one or more secondary records are arranged for each of one or more categories based on the data read from the database 332; and the secondary data analyzer 322 configured to acquire secondary analysis data in which one or more secondary analysis records are arranged for each of one or more categories, extract secondary analysis records of a predetermined category from the secondary analysis data based on a data arrangement of the secondary analysis data, perform predetermined second analysis processing on the extracted secondary analysis records to generate one or more secondary result records, and generate secondary result data in which one or more secondary result records are arranged for each of one or more categories. The application manager 334 may be configured to cause the secondary data analyzer 322 to acquire secondary data generated by the database accessor 335 as secondary analysis data, and cause the database accessor 331 to acquire the secondary result data generated by the secondary data analyzer 322 as registration data. Multi-stage data analysis in accordance with the accumulation state of data in the database 332, and to promote further effective utilization of the database 332, can be performed.

The data collection device 300 may further include the analyzer storage unit 320 configured to store identification information of the secondary data analyzer 322 and a record category for second analysis processing in association with each other, and the application manager 334 may be configured to designate a read target from the database 332 based on a record category associated with the secondary data analyzer 322 in the analyzer storage unit 320 to cause the database accessor 335 to generate secondary data. By narrowing down records to be read out from the database 332 in accordance with the content of the secondary analysis, the processing load on the database 332 can be further reduced.

The data collector 311 may be configured to collect the RAW data in which a plurality of RAW records are arranged in association with time for each of one or more categories, and the primary data analyzer 321 may be configured to extract, from the plurality of RAW records, a RAW record whose value has changed with respect to the RAW record immediately preceding in the time order, as one or more result records. The processing load on the database 332 can readily be reduced while preventing a decrease in the amount of information included in the plurality of RAW records.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A data collection device comprising circuitry configured to:
store one or more collector programs each of which includes instructions of collecting, from industrial equipment, log data having an array structure that includes records arranged in one or more dimensions, and attribute definition data of each value of at least one of the dimensions;
store one or more analyzer programs each of which includes instructions of:
acquiring analysis data having the array structure;
extracting analysis records from the analysis data based on a data arrangement of the analysis data; and
generating result data having the array structure based on the extracted analysis records;
store a database accessor program which includes instructions of:
acquiring registration data having the array structure;
converting the registration data from the array structure into a predetermined database format based on a data arrangement of the registration data, wherein the database format is a tag structure in which each record included in the database format is identified by a structured tag that is added to the record based on each value of the one or more dimensions and based on the attribute definition data of the registration data; and
registering the converted registration data in a database;
execute one or more programs selected from the one or more collector programs and the one or more analyzer programs;
transfer data generated by execution of the selected one or more programs to the database accessor program as the registration data; and
execute the database accessor program to register the transferred data in the database.

2. The data collection device according to claim 1, wherein the circuitry is configured to:
execute a collector program of the one or more collector programs to generate the log data;
transfer the generated log data to an analyzer program of the one or more analyzer programs as the analysis data;
execute the analyzer program to generate the result data; and
transfer the generated result data to the database accessor program as the registration data.

3. The data collection device according to claim 2, wherein the circuitry is configured to extract, by executing the analyzer program, the analysis records from the analysis data based on each value of the one or more dimensions and the attribute definition data of the log data.

4. The data collection device according to claim 2, wherein the circuitry is further configured to transfer the generated log data to the database accessor program as the registration data.

5. The data collection device according to claim 4, wherein the circuitry is further configured to:
acquire a predetermined necessity setting of registering the log data; and
transfer the generated log data to the database accessor program as the registration data in response to determining that registering the log data is necessary based on the necessity setting.

6. The data collection device according to claim 4, wherein the circuitry is configured to:
determine a necessity of registering the generated log data based on the result data; and
transfer the generated log data to the database accessor program as the registration data in response to determining that registering the log data is necessary.

7. The data collection device according to claim 2, wherein the circuitry is configured to:
store a second database accessor program including instructions of:
extracting secondary records from the database; and
generating secondary data having the array structure by arranging the secondary records based on the database format;
execute the second database accessor program to generate the secondary data;
transfer the secondary data to a second analyzer program of the one or more analyzer programs as the analysis data;
execute the second analyzer program to generate the result data as secondary result data;
transfer the generated secondary result data to the database accessor program as the registration data; and
execute the database accessor program to register the transferred secondary result data in the database.

8. The data collection device according to claim 7, wherein the circuitry is configured to, by executing the second database accessor program, arrange the secondary records based on a structured tag added to each of the secondary records.

9. The data collection device according to claim 7, wherein the circuitry is further configured to:
designate the attribute definition data of the secondary data based on the attribute definition data of the analysis data of the second analyzer program; and
execute the second database accessor program to generate the secondary data according to the designated attribute definition data.

10. The data collection device according to claim 9, wherein the circuitry is configured to, by executing the second database accessor program, arrange the secondary records based on the designated attribute definition data and a structured tag added to each of the secondary records.

11. The data collection device according to claim 2, wherein the log data includes a plurality of log records arranged along a timeline, and
wherein the circuitry is configured to generate, by executing the analyzer program, the result data by extracting a record from the plurality of log records based on a comparison between the log record and a previous log record located before the log record along the timeline.

12. A non-transitory memory device having instructions stored thereon that, in response to execution by a processing device, cause the processing device to perform operations comprising:
collecting, from industrial equipment, log data having array structure in which each record included in the array structure is identified by a position in a data arrangement;
extracting analysis records from the log data based on the data arrangement of the log data;
generating result data having the array structure based on the extracted analysis records;
converting the result data from the array structure into a predetermined database format based on a data arrangement of the result data;
registering the converted result data in a database;

extracting secondary records from the database;
generating secondary data having the array structure by arranging the secondary records based on the database format;
extracting secondary analysis records from the secondary data based on a data arrangement of the secondary data;
generating secondary result data having the array structure based on the extracted secondary analysis records;
converting the secondary result data from the array structure into the database format based on a data arrangement of the secondary result data; and
registering the converted secondary result data in the database.

13. The memory device according to claim 12, wherein the database format is a tag structure format in which each record included in the database format is identified by a structured tag added to the record, and
wherein said converting includes adding a structured tag to each record of the registration data based on the data arrangement of the result data.

14. The memory device according to claim 12, wherein the operations further comprise:
converting the log data from the array structure into the database format based on the data arrangement of the log data; and
registering the converted log data in the database.

15. The memory device according to claim 12, wherein the database format is a tag structure in which each record is identified by a structured tag individually added to the record, and
wherein the secondary records are arranged based on a structured tag added to each of the secondary records.

16. A data collection method comprising:
collecting, from industrial equipment, log data having array structure that includes records arranged in one or more dimensions, and attribute definition data of each value of at least one of the dimensions;
extracting analysis records from the log data based on a data arrangement of the log data;
generating result data having the array structure based on the extracted analysis records;
converting the result data from the array structure into a predetermined database format based on a data arrangement of the result data, wherein the database format is a tag structure in which each record included in the database format is identified by a structured tag that is added to the record based on each value of the one or more dimensions and based on the attribute definition data of the result data; and
registering the converted result data in a database.

17. The data collection method according to claim 16, wherein extracting the analysis records comprises extracting the analysis data based on each value of the one or more dimensions and the attribute definition data of the log data.

18. The data collection method according to claim 16, further comprising:
converting the log data from the array structure into the database format based on the data arrangement of the log data; and
registering the converted log data in the database.

19. The data collection method according to claim 16, further comprising:
extracting secondary records from the database;
generating secondary data having the array structure by arranging the secondary records based on the database format;
extracting secondary analysis records from the secondary data based on a data arrangement of the secondary data;
generating secondary result data having the array structure based on the extracted secondary analysis records;
converting the secondary result data from the array structure into the database format based on a data arrangement of the secondary result data; and
registering the converted secondary result data in the database.

20. The data collection method according to claim 19, wherein generating the secondary data comprises arranging the secondary records based on a structured tag added to each of the secondary records.

* * * * *